United States Patent [19]

Sackschewsky

[11] 4,216,683
[45] Aug. 12, 1980

[54] AUTOMATIC TRANSMISSION

[76] Inventor: William A. Sackschewsky, 828 W. Olive St., Fort Collins, Colo. 80521

[21] Appl. No.: 760,285

[22] Filed: Jan. 19, 1977

[51] Int. Cl.$^2$ ............................................. F16H 47/08
[52] U.S. Cl. ........................................ 74/688; 74/677
[58] Field of Search ............... 74/682, 677, 688, 720 S

[56] References Cited

U.S. PATENT DOCUMENTS

| | | | |
|---|---|---|---|
| 2,851,906 | 9/1958 | DeLorean | 74/682 |
| 2,876,656 | 3/1959 | Herndon | 74/688 |
| 2,919,607 | 1/1960 | Moore | 74/688 |
| 2,968,197 | 1/1961 | DeLorean | 74/677 |
| 3,030,824 | 4/1962 | Moore | 74/677 |
| 3,159,052 | 12/1964 | O'Malley et al. | 74/688 |
| 3,273,420 | 9/1966 | O'Malley | 74/688 |
| 3,355,967 | 12/1967 | Moan | 74/688 |

*Primary Examiner*—Allan D. Herrmann
*Attorney, Agent, or Firm*—H. Hume Mathews

[57] ABSTRACT

The principal components of this transmission include a pump, a turbine, a primary planetary gear set, a secondary planetary gear set and a compound planetary gear set. In one embodiment the compound planetary gear set has a compound planet gear element with two planet gears connected to each other on each planet shaft. The largest planet gear engages a ring gear and a first sun gear and the smaller planet gear engages a direction reversing planet idler gear which engages a second sun gear. The ring gear of the compound planetary gear set is preferably connected to the ring gear of the primary planetary gear set. The second sun gear is preferably connected to the ring gear of the secondary planetary gear set. The first sun gear is preferably connected to the sun gear of the primary planetary gear set and to the planet carrier of the secondary planetary gear set. Overrunning clutches are preferably provided to prevent the sun gear of the secondary planetary gear set from rotating faster than the pump and to prevent the compound planet carrier from rotating in a negative direction. Alternative embodiments are disclosed and claimed.

16 Claims, 11 Drawing Figures

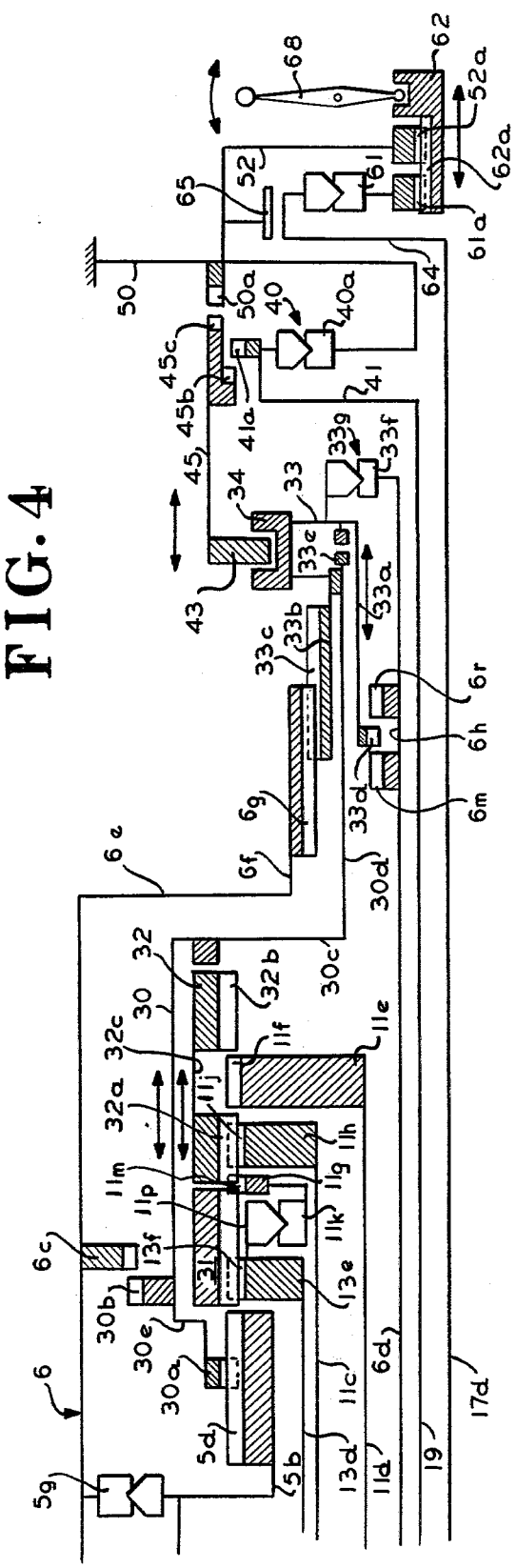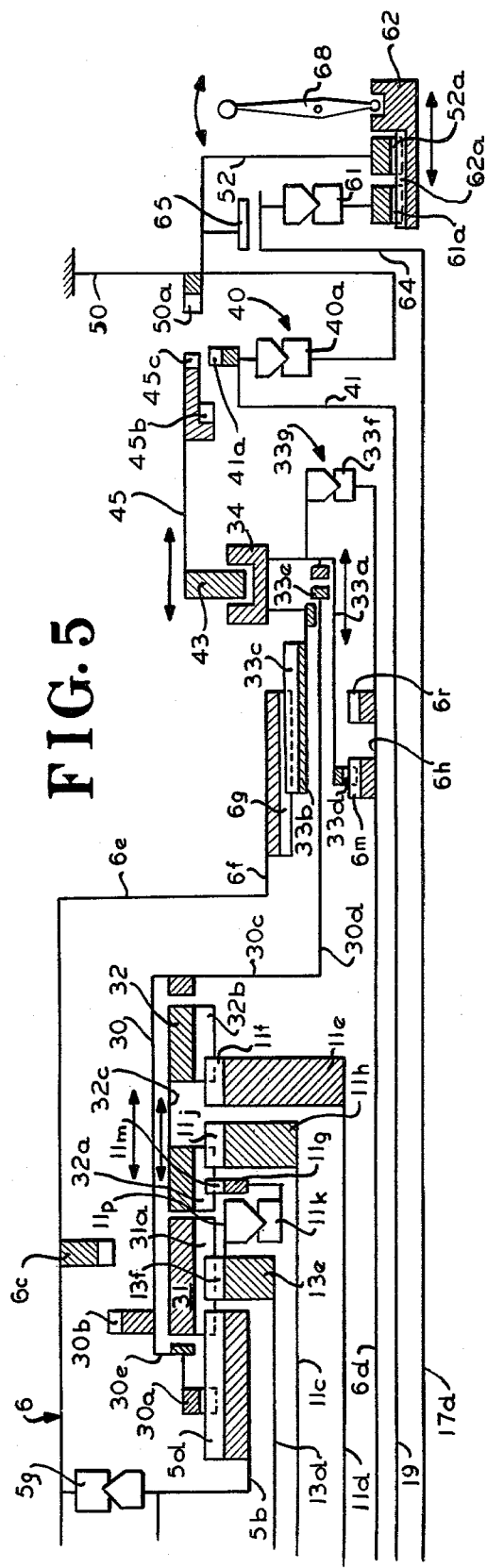

AUTOMATIC TRANSMISSION

BACKGROUND OF THE INVENTION

1. Field of the Invention

This invention is an automatic transmission in which the turbine of a first fluid coupler normally is connected directly to a sun gear of a primary planetary gear set. The output from the transmission is connected to the planet carrier of the primary gear set and means are provided to control the rotation of, and the torque applied to, the ring gear of the primary planetary gear set. In broad terms, if a positive rotation is imparted to the primary sun gear while the output, or the planetary carrier, is stalled, the primary ring gear will tend to rotate negatively unless it is restrained. If the primary ring gear is not restrained at all, it will rotate negatively at the appropriate speed so that it deducts from, or subtracts from, the positive rotation of the sun gear to result in a net output of zero from the planet carrier. In basic principle, this invention applies various means to restrict or restrain the tendency of the primary ring gear to rotate negatively, thus applying a net positive torque and rotation to the output from the planet carrier.

2. Brief Description of the Prior Art

The U.S. Pat. No. 3,455,183 to Orshansky discloses a hydromechanical transmission having some similarities to Applicant's transmission. There is a direct input to the sun of a primary planetary gear set, the output is taken from the primary planet carrier and the primary ring gear is controlled through various means so that the overall transmission ratio may be varied. In other respects, the Orshansky device is not similar to the Applicant's transmission. Orshansky does not contemplate or permit the primary ring gear to rotate negatively to subtract from positive rotation of the primary sun gear, and this is one of the major features of Applicant's invention. Also, the Orshansky transmission does not proceed through each stage of operation automatically, but it requires complex hydraulic and other control means to condition the transmission for each phase of its progression. Finally, the present invention will be seen to produce a "regenerative power feed back" in various modes of operation as the result of restraining forces on the primary ring gear, which assists in the transmission of power to the output. To the contrary in Orshansky, most or all of the reaction forces are dissipated in the hydraulic units.

SUMMARY OF THE INVENTION

In the present invention, the input is to a primary sun gear and the output is from a primary planet carrier, while a primary ring gear is allowed to rotate in either direction under a positive torque. The rotation of the primary ring gear is initially in a negative direction as the transmission starts up from stall; however, the application of positive torque to the primary ring gear restrains and reduces, and may eventually reverse, this negative rotation. It may be seen that the overall input to output ratio is determined by the degree to which the primary ring gear deducts from the positive rotation of the primary sun gear. This principal feature in combination with the means for applying the positive torque to the primary ring gear, comprise Applicant's invention.

In all embodiments, another "simple" planetary gear system is provided to include a sun gear, of smaller diameter than the primary sun gear, and connectable to the turbine, a planet gear, a planet carrier, which is prevented from rotating negatively, and a ring gear connected to the primary ring gear. This arrangement limits the negative rotation of the primary ring gear, depending on the speed of the turbine, and generally comprises the first or lowest range of operation in each embodiment.

Other means are preferably provided to apply additional positive torque to the primary ring gear and to produce higher ranges. In one embodiment, a second fluid coupler has first and second rotors connected to the turbine and primary ring gear, respectively.

In other embodiments, gear means are provided. In addition to the primary planetary gear set there is a secondary planetary gear set and a compound planetary gear set (replacing the "simple" planetary gear set). The compound planetary gear set may have a compound planetary gear with two gear elements connected to each other and rotatable about a common planet carrier. A single ring gear engages one of the planet gear elements and is connected to the primary ring gear. A first sun gear engages one planet gear element and a second sun gear, smaller than the first, engages a direction reversing idler which in turn engages the remaining planet gear element. Both the first and second sun gears are smaller than the primary sun gear. The second sun gear is preferably connected to the ring gear of a secondary planetary gear set. The first sun gear, the primary sun gear, and the secondary planet carrier are all preferably connected or connectable to each other and to the turbine. One-way clutches preferably prevent the sun gear of the secondary planetary gear set from overrunning the pump and prevent the compound planet carrier from rotating negatively. As will be explained in the detailed description, this arrangement of gears, etc. will provide several operating ranges and ratios during which the tendency of the primary ring gear to deduct from the positive rotation of the primary sun gear, will be restrained and reduced.

Several alternative embodiments are disclosed.

BRIEF DESCRIPTION OF THE DRAWINGS

FIG. 4 is a schematic drawing which is equivalent to the structure shown in FIGS. 1B and 1C wherein the transmission is in neutral.

FIG. 5 is a schematic drawing showing the same structure as FIG. 4, except the transmission is now conditioned for automatic forward drive.

DETAILED DESCRIPTION OF A PREFERRED EMBODIMENT

Figure 1A:
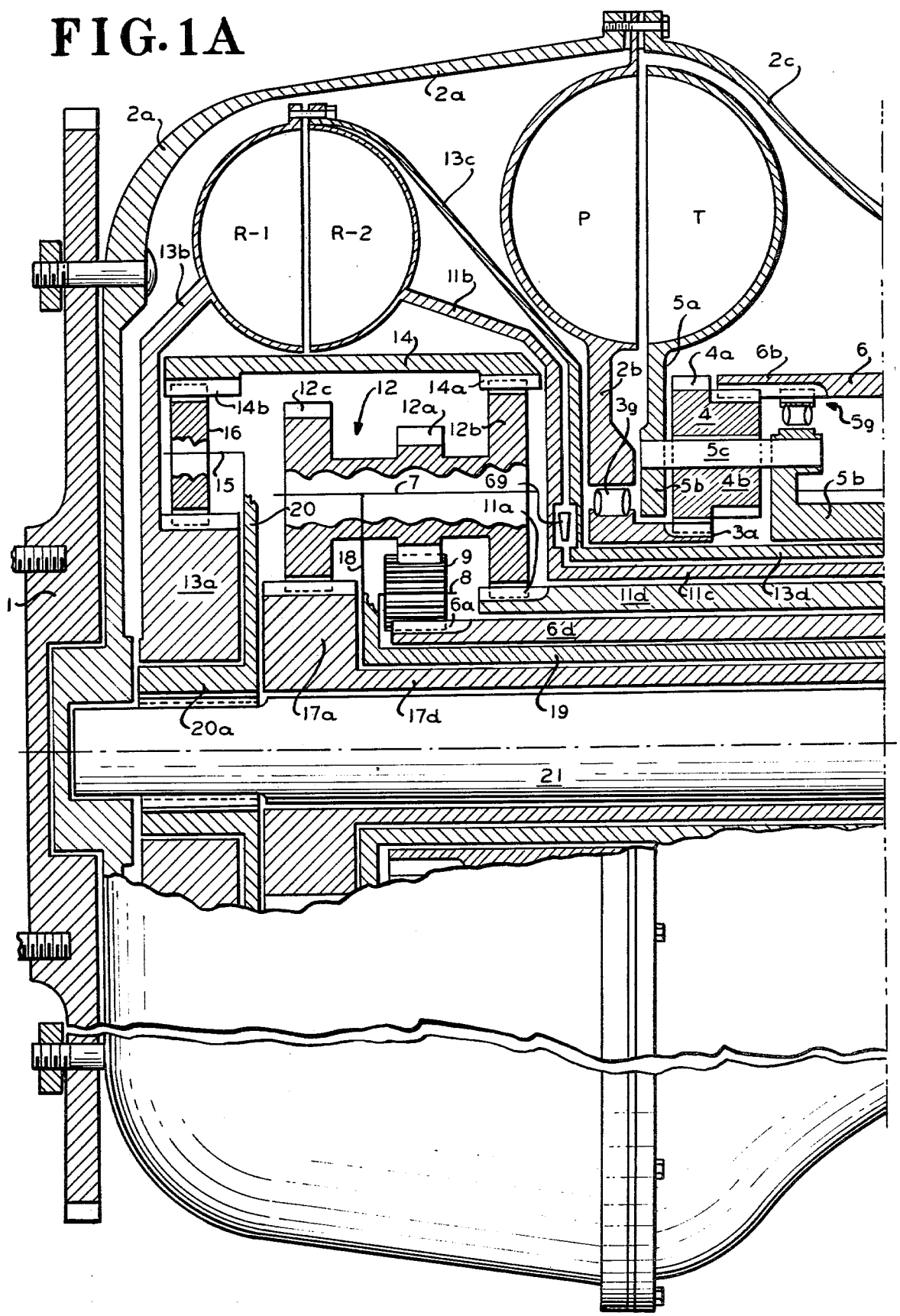
FIG. 1A is a sectional view of the front portion of the preferred embodiment of an automatic transmission constructed in accordance with this invention.
Figure 1B:
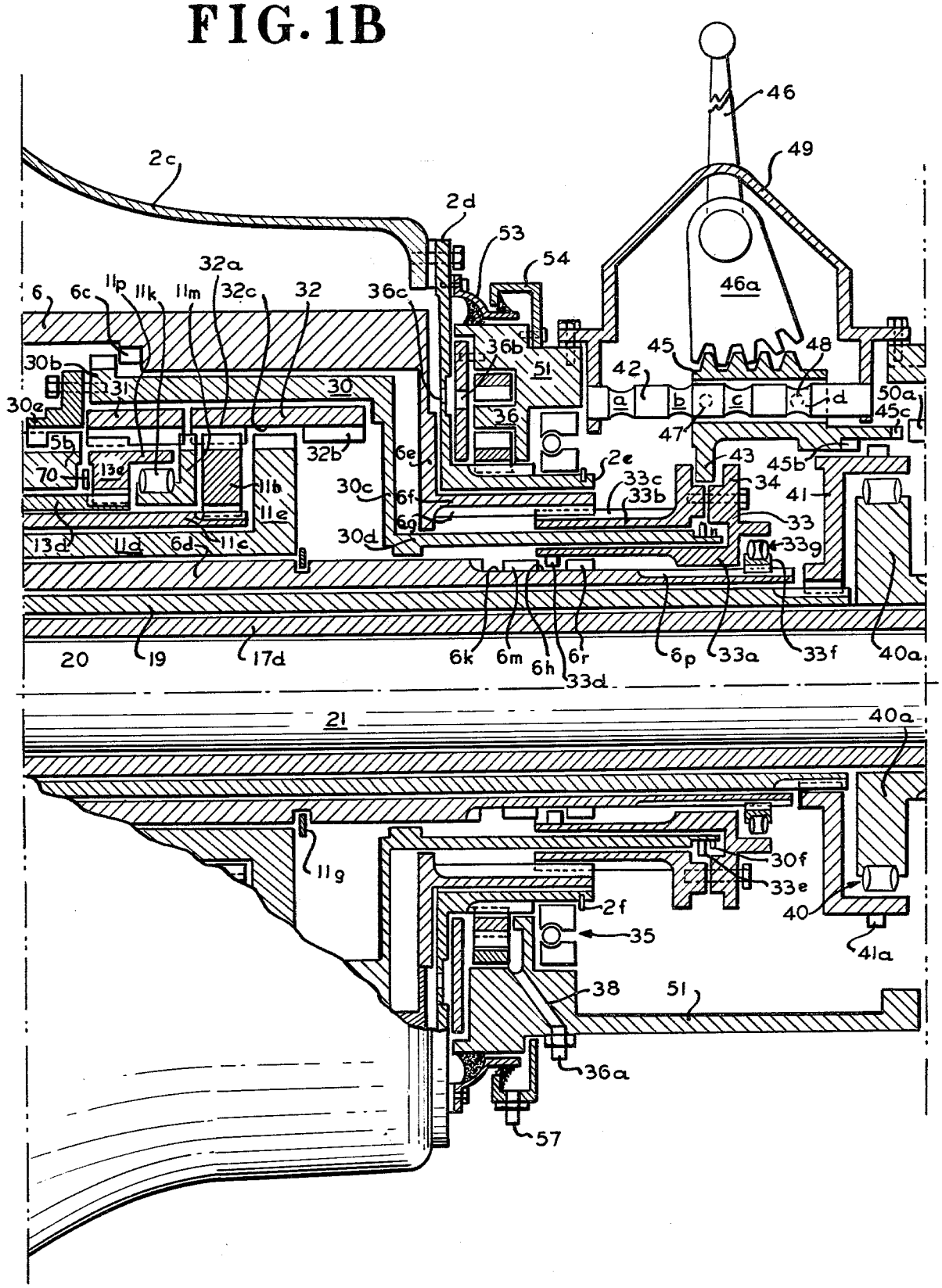
FIG. 1B is a section view of the middle portion of the preferred embodiment of a transmission constructed in accordance with this invention.
Figure 1C:
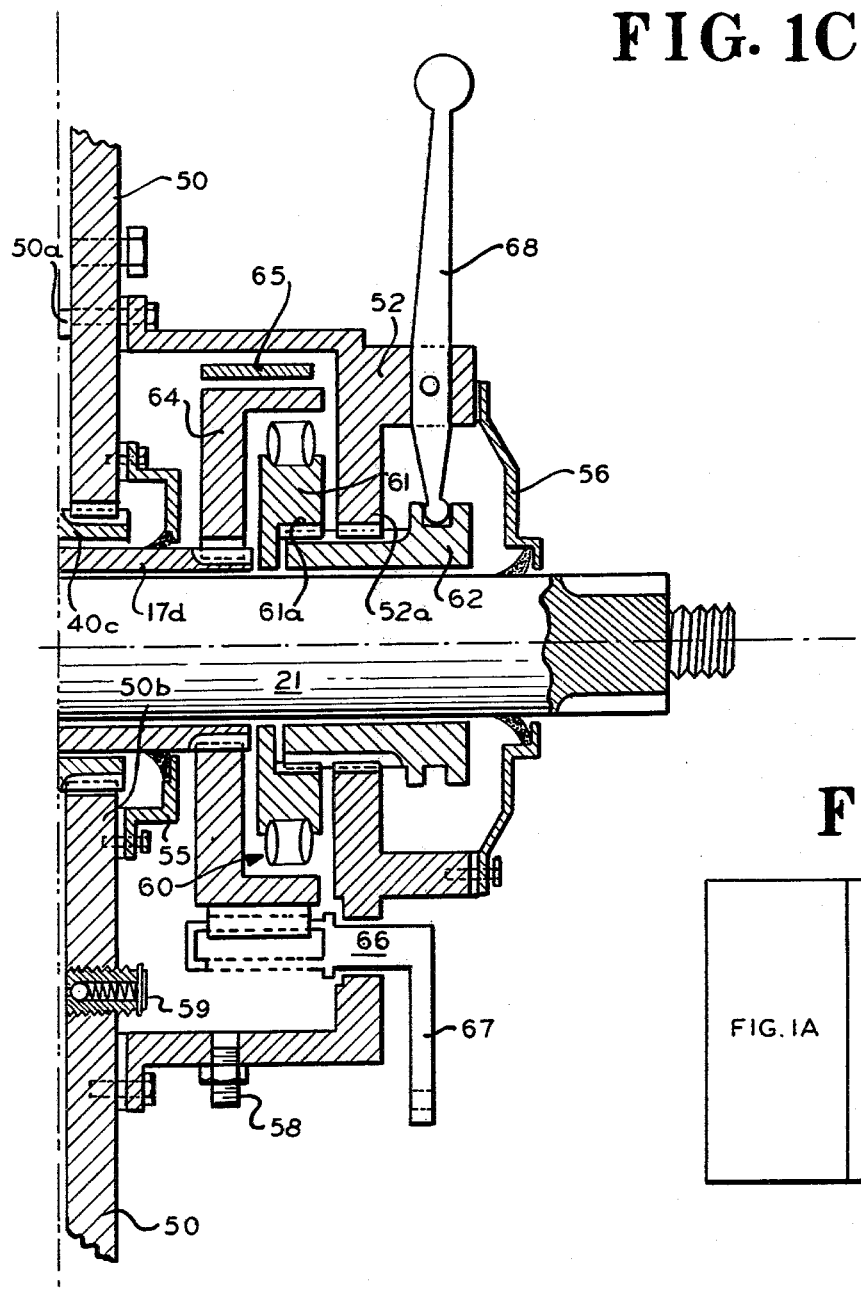
FIG. 1C is a sectional view of the rear portion of the preferred embodiment of a transmission constructed in accordance with this invention.
Figure 2:
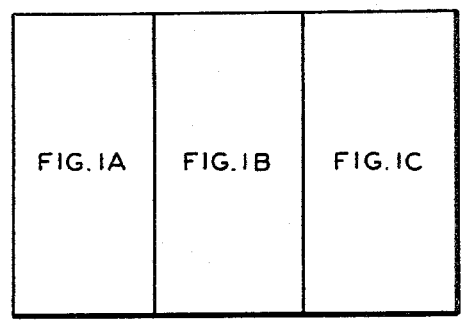
FIG. 2 is a box drawing illustrating the relative positions of FIGS. 1A, 1B and 1C and the manner in which those figures relate to each other.
Figure 6:
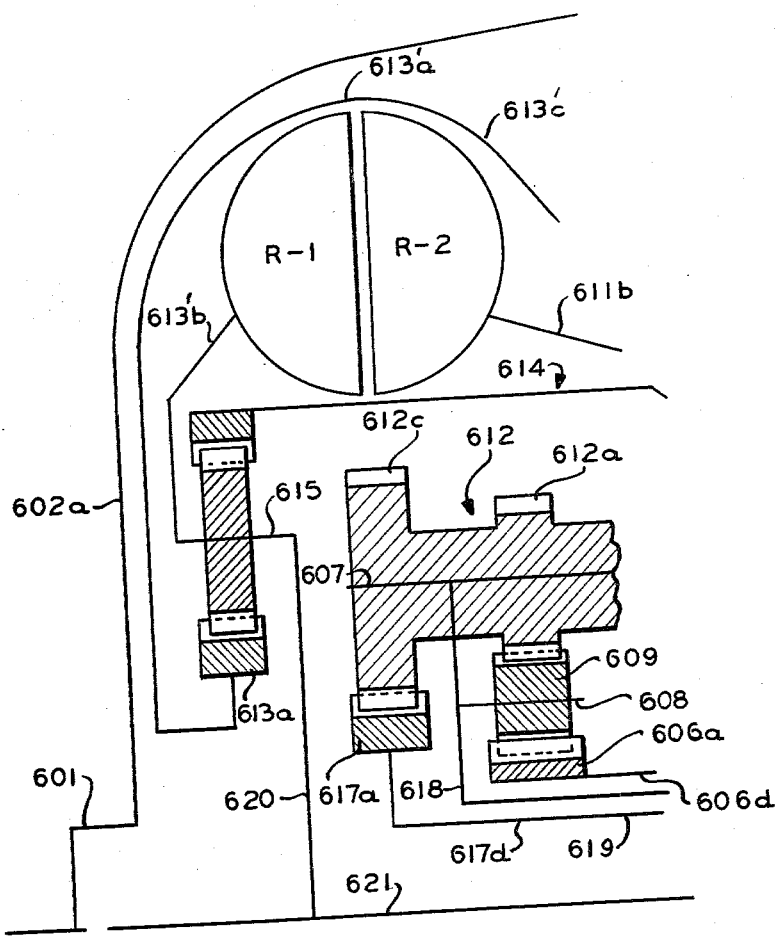
FIG. 6 is a schematic view of an alternative embodiment of the forward portion of the transmission illustrated in FIGS. 1A and 3.

A complete description follows, based upon FIGS. 1A, 1B and 1C; however, the identical description applies to schematic FIGS. 4, 5 and 6, except that certain parts of the transmission are not shown in the schematic Figures in order to simplify understanding. In order to avoid repetitive descriptions, elements of the alternative embodiments are not separately described which are equivalent to elements shown in FIGS. 1 through 6, but they are labeled with similar numerals except with the addition of 700, 800 or 900 for the embodiments in FIGS. 7, 8 and 9. Specific descriptions of the alternative embodiments will only be made where equivalents are not found in the embodiment shown in FIGS. 1 through 6, or where differing functional descriptions are provided.

Beginning with FIGS. 1 through 6, input adapter 1 may be the flywheel of the power plant. Attached to adapter 1 is the front bell housing 2a. Output shaft 21 extends longitudinally through the center of the transmission and forms the main shaft upon which most of the elements of the transmission are mounted. Note specifically that bell housing 2a is journaled about an extension of output shaft 21. Splined to the foward end of output shaft 21 is planet carrier 20, which carries a multiple of shafts 15, upon which planet gears 16 are rotatably mounted. Planet gears 16 engage a ring gear 14b which is part of a larger unit which will be identified as the stabilizer 14. Planet gears 16 also mesh with a sun gear 13a, rotatably mounted on a tubular extension 20a of carrier 20. Rotatably mounted on output shaft 21 is a tubular shaft 17d which is preferably integral with a sun gear 17a. Rotatably mounted on shaft 17d is another tubular shaft 19, which is attached at its forward end to planet carrier 18 which, in turn, is attached to a multiple of planet shafts 7 and planet counter shafts 8. Compound planet clusters 12 are mounted on the shafts 7, comprising three planet gears described according to size as small planet gear 12a, large planet gear 12b, and intermediate planet gear 12c. Also mounted on each shaft 8 is the small planet idler gear 9, which engages planet gear 12a and which will be seen to cause planet gear 12a and sun gear 6a to rotate in the same direction. In clusters 12, the planet gear 12c engages previously described sun gear 17a, planet gear 12b engages a ring gear 14a, which is preferably integral with stabilizer 14. Planet gear 12b also engages a sun gear 11a and reversing pinion 9 engages a sun gear 6a. A tubular shaft 6d is rotatably mounted about shaft 19, and sun gear 6a is preferably milled into the end of shaft 6d. Tubular shaft 11b is rotatably mounted about shaft 6d and likewise, sun gear 11a is preferably milled into the end of shaft 11d. Near the rear end of shaft 6d, two sets of teeth, 6m and 6r, are preferably milled into the shaft in spaced relation so that an annular space 6k is positioned immediately forward of both sets of teeth and a second annular space 6h is positioned between the sets of teeth 6m and 6r. The rear end of shaft of 6d is splined as shown at 6p. The rear end of shaft 11d is preferably integrally formed with a flange 11e, which is provided around its circumference with splined teeth. Rotatably mounted about shaft 11d is tubular shaft 11c.

The forward end of shaft 11c is attached to a shroud 11b which, in turn, is connected to the rear rotor R-2 of a second fluid coupler. Rotatably mounted about shaft 11c is the inner race of a one-way clutch 11k which has an outwardly extending flange 11m having splined teeth around its circumference. The rearward end of shaft 11c is preferably connected by means of splines to a flange 11h having splined teeth around its circumference. Also rotatably mounted about shaft 11c is tubular shaft 13d which is attached to its forward end to a shroud 13c which, in turn, is attached to the forward rotor R-1 of the second fluid coupler, previously described. Rotor R-1 is also connected to the first described sun gear 13a through flange 13b. Splined to the rearward end of shaft 13d is a flange 13e which has splined teeth around its circumference, and which is also connected to a collar 11p forming the outer race of one-way clutch 11k.

As will be apparent from viewing the drawings, each of the tubular shafts described preferably is nested upon the other in pyramid fashion, with the longest shaft being the output shaft 21, and each intermediate tubular shaft being shorter and shorter up to shaft 13d. It will also be apparent from the drawings that the splined teeth on each of the elements labeled 11e, 11h, 11m and 13e are aligned at the same radial distance from the central axis. It is noted at this point that one-way clutch 11k is designed to prevent the inner race from rotating faster (in a positive direction) than the outer race.

A sun gear 3a is rotatably mounted about the forward end of shaft 13d. The inner race of a one-way clutch 3g is connected directly to sun gear 3a and the outer race of one-way clutch 3g is connected to an extension 2b from the housing of first fluid coupler pump P. One-way clutch 3g is designed to prevent the inner race from rotating faster than the outer race, thereby preventing sun gear 3a from over-running pump P. Pump P is connected to and directly driven by the outer bell housing 2a. A planet gear carrier 5b is rotatably mounted about shaft 13d. Planet gear shaft 5c is supported by planet gear carrier 5b and is also connected to an extension 5a from the turbine T portion of the first fluid coupler. A compound planet gear 4 is rotatably mounted about each shaft 5c and compound planet gear 4 comprises a larger planet gear 4a engaging the sun gear 3a and a smaller planet gear 4b which engages a ring gear 6b. Planet carrier 5b is also provided with elongated splined teeth aligned at the same radial distance as the teeth on elements 13e, 11m, 11h and 11e. The splined external teeth on carrier 5b slidably engage internal teeth formed integrally on internal flange 30e. Flange 30e is attached to a sliding assembly generally designated 30, which forms an annular retainer for two floating connector rings generally designated 31 and 32. Connector ring 31 is a wide ring gear having internal teeth which are slidably engageable with either of elements 13e and 11m, or with elements 5b and 13e. Connector ring 32 has axially spaced internally toothed sections 32a and 32b, with an annular space 32c therebetween. It may be seen from the drawings that as the annular retainer 30 is moved axially in either direction the sets of teeth formed in connector rings 31 and 32 will engage and connect certain of the splined teeth on elements 11e, 11h, 11m, 13e and 5b. The specific positions and engagements of these teeth will be described more fully below as part of the description of the modes of operation of this invention.

Annular retainer 30 is also provided arounds its outer circumference with splined teeth on flange 30b. Rotatably mounted about annular retainer 30 is tubular shaft 6, a portion of which extends forwardly to connect directly to ring gear 6b. Internal teeth 6c are also formed in the shaft 6 for engagement with the external splined teeth on flange 30b, previously described. It should be seen that axial movement of the annular retainer 30 will cause engagement or disengagement of the teeth 6c with the teeth on flange 30b. A one-way clutch 5g is also provided between the extension of tubular shaft 6 and the planet carrier 5b, so that the outer race, i.e. the ring gear 6b may not rotate faster than the inner race, i.e. planet carrier 5b and turbine T.

The annular retainer 30 is provided at its rearward end with an inwardly extending flange 30c which is directly connected to a tubular extension 30d, which is rotatably and slidably supported about tubular shaft 6d. Similarly, tubular shaft 6 is provided at its rearward end with inwardly extending flange 6e and a tubular extension 6f which is rotatably, but not slidably, mounted about extension 30d. Extension 6f is also provided with elongated splined internal teeth 6g. A short tubular member 33b is rotatably mounted about extension 30d between extension 30d and extension 6f, and tubular member 33b is provided with elongated splined external teeth 33c which slidably engage with internal teeth 6g. A thrust ring 30e is secured to the end of tubular extension 30d by a retainer ring 30f.

Flanged tubular member 33a is rotatably and slidably mounted about shaft 6d. The forward end of flanged tubular member 33a is provided with internal teeth 33d which may engage splined teeth 6m or 6r on shaft 6d. The flange 33 of flanged tubular member 33a extends outwardly and partially around the rearward end of tubular extension 30d, where the flange 33 is bolted to tubular section 33b. Flange extensions on tubular section 33b and on flanged tubular member 33a form an annular collar 34 which is engaged by shift dog 43. Flange 33 is also connected to the outer race of a one-way clutch 33g. The inner race 33f has internal teeth and slidably engaged splined teeth 6p formed on the rearward end of shaft 6d. One-way clutch 33g is constructed to prevent the inner race, and consequently, shaft 6d, from rotating faster than the outer race, or ring gear 6b. It may be seen that the entire unit comprised of the elements labeled 33 is rotatable and slidable. When shift dog 43 is used to shift the assembly 33 forward or rearward, the assembly 33 will push against thrust ring 30e and consequently cause tubular extension 30d and unit 30 to move forward or rearward. It may also be seen that movement of unit 30 will cause ring connectors 31 and 32 to slide forward or rearward, thus engaging with the teeth of one or more of the control elements 5b, 13e, 11m, 11h or 11e.

A rear bell housing 2c is bolted to front bell housing 2a at the same point where front bell housing 2a is bolted to a flange 2b on first fluid coupler pump P. The rearward end of bell housing 2c is bolted to a flange 2d and the combination of front and rear bell housings 2a and 2c thus encloses the forward portion of the transmission, as previously described. It will be seen in the drawings that flange 2d provides a thrust bearing surface for flange 6e, and thus unit 6.

A rearwardly extending tubular extension 2e preferably is formed integrally with flange 2d. Tubular extension 2e is rotatably mounted about extension 6f. A gear-type oil pump 36 is splined to tubular extension 2e and a series of oil ports 36c are provided around flange 2d. An oil pump inlet 36a is connected to pump 36 through a channel 38 in housing 51. Oil pump inlet 36a may be connected to an oil reservoir (not shown). The body of oil pump 36 is preferably an integral part of housing 51. An oil pump outlet 36b aligns with oil ports 36c. The stationary housing 51 supports the rearward end of tubular extension 2e (which in turn supports bell housing 2) through ball bearing 35 which is secured by a retainer ring 2f. The housing 51 is supported by a main support bracket 50 which may be attached to the vehicle frame in a conventional manner. An oil pressure relief valve 59 may be mounted in and through the support bracket 50.

A shift assembly cover 49 is bolted to an opening in the top of housing 51. A shift lever 46 is attached to and operates a partial pinion 46a which engages a rack 45. Rack 45 is slidably mounted on detent shaft 42 and is preferbly integral with shift dog 43. As illustrated, detent shaft 42 is supported by flange extensions from cover 49. The rack is slidable on detent shaft 42 and rack 45 includes two spring loaded detent balls 47 and 48 which are alternately engageable with four detent positions, labeled a, b, c and d on detent shaft 42.

The rearward end of shaft 19 is splined to receive a flange 41 which is connected to the outer race of a one-way clutch 40. The inner race 40a of one-way clutch 40 is mounted about shaft 17d and provided with a collar 40c having splines which mesh with female teeth formed on a short extension 50b of main support bracket 50. This connection prevents the inner race of one-way clutch 40 from rotating in any direction and one-way clutch 40 is designed to prevent rotation of the outer race and therefore shaft 19 in a negative direction. Shaft 17d extends axially rearward of support bracket 50, where it is splined to a flange 64 which is attached to the outer race of another one-way clutch 60. The inner race 61 of one-way clutch 60 is rotatably mounted about output shaft 21. Inner race 61 is provided with a collar 61a having internal teeth which mesh with splined teeth on a tubular connector 62. Tubular connector 62 is rotatably and slidably mounted about output shaft 21 so that it may be moved axially into and out of engagement with teeth on collar 61a on inner race 61. A rear housing section 52a is provided with female teeth which slidably engage splined teeth of tubular connector 62. A shift lever 68 is supported by rear housing 52 and engages tubular connector 62 so that tubular connector 62 may be moved axially. It will be seen that the splined teeth of tubular connector 62 always engage the flange 52a of rear housing 52.

One-way clutch 60 is designed so that the outer race is prevented from rotating negatively, relative to the inner race so that, when the connecting collar 62 is engaged with the inner race 61 the shaft 17d will be prevented from rotating negatively. The outer race of one-way clutch 60 is encircled by a clutch band 65 which, when engaged, will prevent shaft 17d from rotating in either direction. Clutch band 65 is preferably controlled by a forked shaft 66 and lever 67 which may be operated in any conventional manner.

The outer race of one-way clutch 40 is provided with splined teeth 41a around its exterior circumference. At least one tooth 45b formed on the inside of rack 45 may be moved into or out of engagement with teeth 41a. An additional tooth 45c on rack 45 may slide into or out of engagement with teeth 50a which protrude forwardly from main support bracket 50. It may be seen that teeth 45c and 45b engage with teeth 50a and 41a simultaneously and that in this condition shaft 19 will be prevented from rotating.

A rear housing cover and oil seal 56 is attached to the rear housing section 52 which prevents leakage of oil around shaft 21. Another oil seal 55 is attached to the rear of main bracket 50 and prevents oil leakage from around shaft 17d. Another oil seal 53 is attached to the rear of flange 2d to prevent oil leakage around housing 51, and another oil seal 54 is attached to housing 51 to collect any oil spill which may seep past oil seal 53. Oil drains 57 and 58 allow oil to drain back to the reservoir (not shown).

A thrust ring 11g is mounted in a groove in tubular shaft 6d to absorb thrust from the forward portion of the transmission. Needle type thrust bearings 70 and 69 provide support for the turbine T and second fluid coupler rotor R-2 and associated shafts and gears.

ALTERNATIVE EMBODIMENTS

In an alternative embodiment partially illustrated in FIG. 6, a transmission is constructed which is precisely the same as the embodiment illustrated in FIGS. 1 through 5, with the exception of three elements. As shown in FIG. 6, the flange 613'b which is attached to second fluid coupler rotor R-1 is connected to pinion shaft 615 and also to output shaft 621. Second fluid coupler rotor R-2 is connected to shroud 611b and ultimately to shaft 611c (not shown in FIG. 6). Sun gear 613a is connected by front housing 613'a to rear housing 613'c. Rear housing 613'c is otherwise precisely the same as housing 13c previously described. Front housing 613'a is connected to and supports sun gear 613a.

Figure 7:
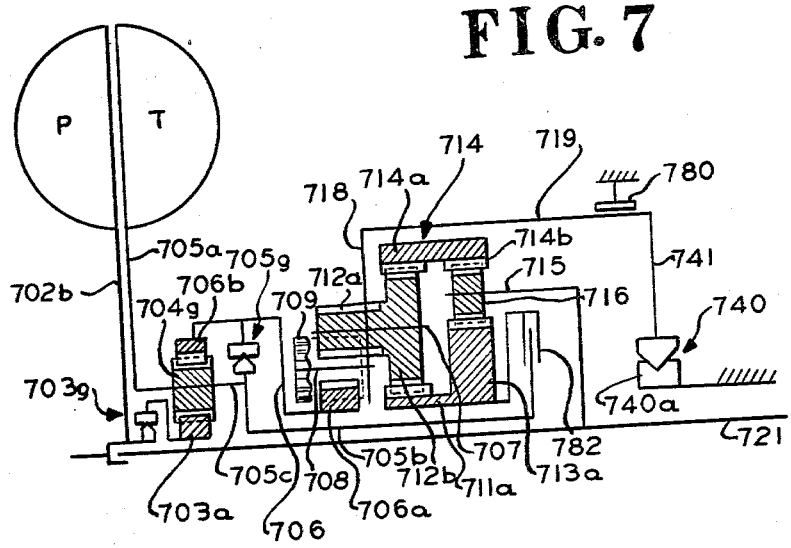
FIG. 7 is a schematic representation of a simplified embodiment of this invention.

A simplified version of the present invention is illustrated schematically in FIG. 7. Each specific element will not be separately described; however, it will be noted that elements which are equivalent to elements in the embodiment of FIGS. 1 through 5 are labeled with numbers which are equal to 700 plus the numbers shown in those Figures. It will be apparent that many of the control elements described in previous embodiments, such as units 30, 31, 32 and 33 have been eliminated and replaced with direct, permanent connections between gears. It will also be noted that the compound planetary gear system associated with stabilizer 14 (714 in FIG. 7) is now placed behind the fluid coupler rather than in front of it; however, it should be apparent that similar elements and connections are shown. In fact, there are only two elements which are different from elements of the previous embodiments. A clutch band 780 is connected to the vehicle frame (ground) and engageable with a shaft 719 to hold the same against rotation under certain conditions. Also, a clutch 782 is engageable to connect sun gears 711a and 713a to planet carrier 705c and turbine T. It should be specifically noted that sun gears 711a and 713a are permanently connected. Otherwise, the differences between FIG. 7 and the embodiment illustrated in FIGS. 1 through 5 merely comprise the elimination of elements and, in some cases, substituting permanent connections for connections which may be disengaged in other embodiments.

Figure 8:
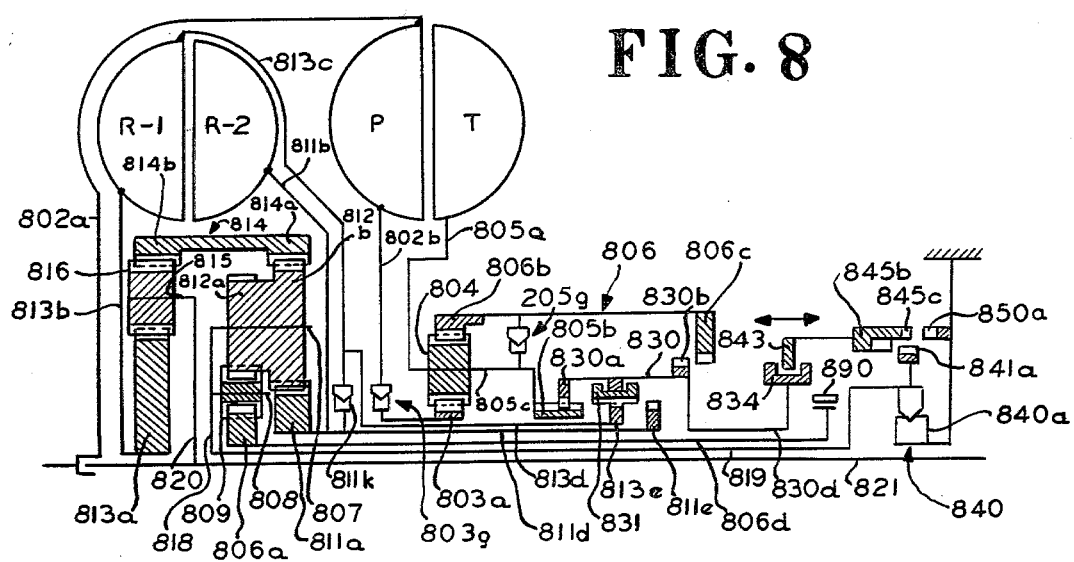
FIG. 8 is a schematic representation of another embodiment of this invention.

FIG. 8 illustrates an embodiment of this invention of intermediate complexity. As with previously described Figures, parts which are similar to previously described parts are labeled with identical numbers in the 800 series. As with the embodiment illustrated in FIG. 7, however, this embodiment is virtually identical to the embodiments shown in FIGS. 1 through 5, except that some parts are omitted entirely and in some cases permanent connections are substituted for switchable connections. The only totally new or different element is clutch band 890 which is engageable to lock shaft 806d against either forward or reverse rotation.

Figure 9:
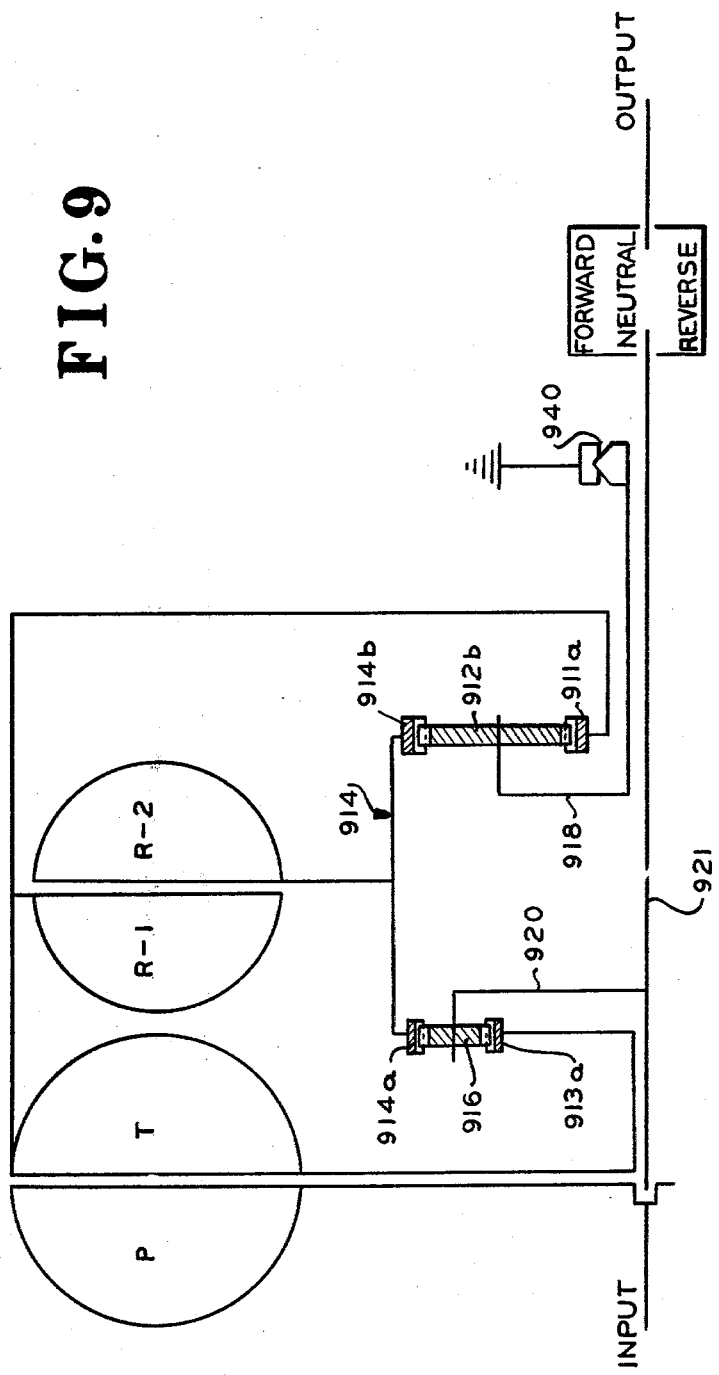
FIG. 9 is a schematic representation of another embodiment of this invention.

FIG. 9 illustrates another simple variation of this invention. This version is similar to the embodiment illustrated in FIG. 7 except in place of the compound planetary gear system, and the secondary planetary gear set is replaced by a second fluid coupler. In the simple planetary system, the ring gear 914b is a part of the stabilizer 914, the planet carrier 918 is connected to one-way clutch 940 (equivalent to one-way clutch 740) and sun gear 911a is connected to the turbine T. In the second fluid coupler, rotor R-1 is connected to the turbine T and rotor R-2 is preferably connected to stabilizer 914, but may be connected to simple planet carrier 918 (this connection not shown). Otherwise, the elements of this embodiment are basically identical to those in previous embodiments and they are numbered accordingly in the 900 series. Note that no reverse mode exists in this embodiment and a separate gear box may be provided for that purpose.

MODES OF OPERATION

The basic principle of operation of this invention is the same in all embodiments. Therefore, a description of the operation of the most complicated embodiment will also serve as a description of most of the operation of the embodiments illustrated in FIGS. 7 and 8.

Figure 3:
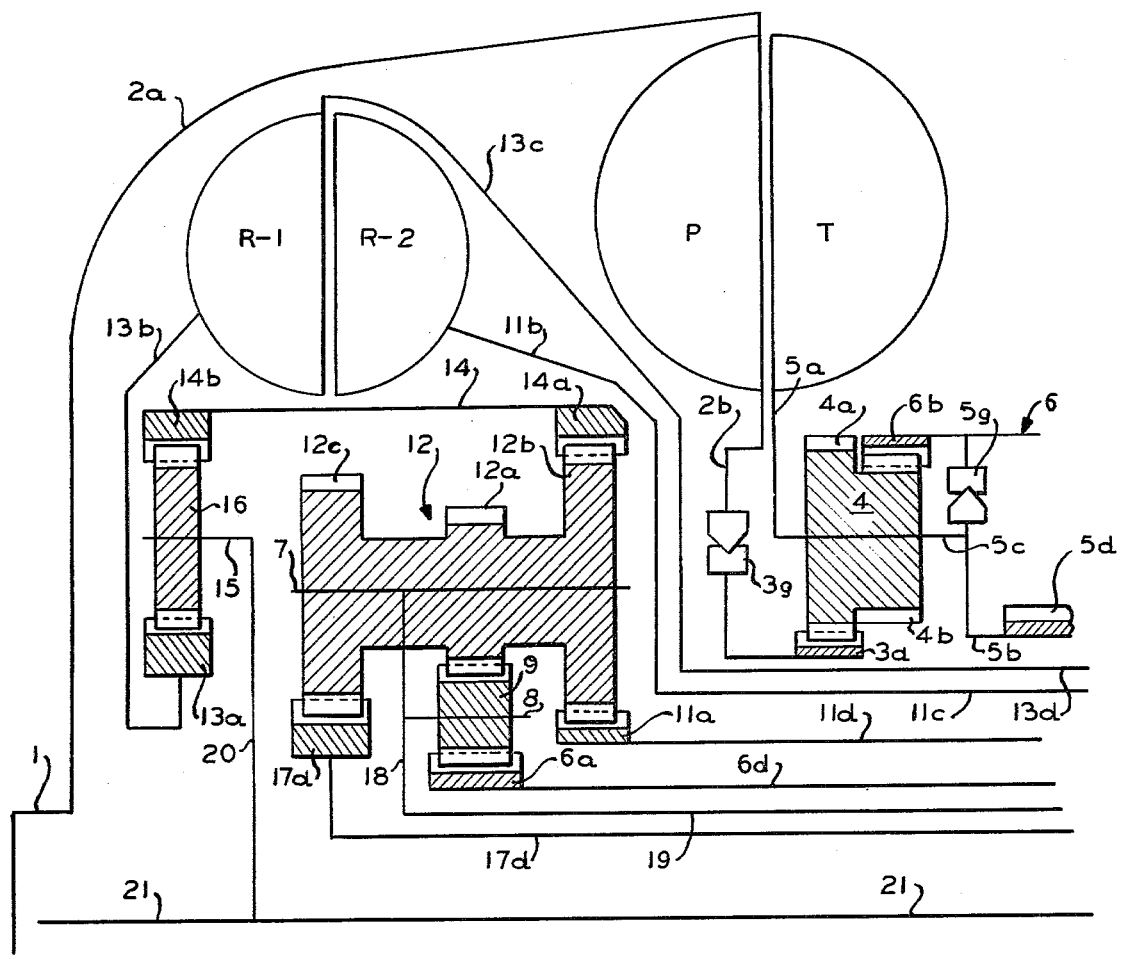
FIG. 3 is a schematic drawing which is equivalent to the structure shown in FIG. 1A.

Referring to FIG. 3, it will be apparent that the output shaft 21 is always driven by planet carrier 20. It will also become apparent that the input from flywheel 1 is always transmitted, at least in part, to sun gear 13a. If it is assumed that sun gear 13a is given a positive rotation while the output is stalled, the ring gear 14b must necessarily rotate negatively. Effectively, the negative rotation of the ring gear is subtracted from the positive rotation of the sun gear to produce zero rotation of the output. If a restraining torque is then placed on ring gear 14b to overcome the load on output shaft 21, the degree of negative rotation of ring gear 14b will be reduced. If the positive rotation of sun gear 13a is not fully subtracted by the negative rotation of ring gear 14b, the resulting positive rotation will be imputed to output shaft 21. This basic principle provides the starting point for describing the operation of this transmission. In all phases of forward drive a positive rotation is directed to sun gear 13a and a positive torque is directed toward ring gear 14b. At times ring gear 14b may rotate negatively or it may not rotate at all, or it may rotate positively. The degree of positive torque placed upon ring gear 14b will react with the positive torque on sun gear 13a and the negative load from output shaft 21 to determine in what direction and at what speed ring gear 14b will rotate, and therefore to determine the overall output ratio of this planetary system. It will become apparent that most of the elements of this transmission are designed to control the speed and torque applied to ring gear 14b.

Neutral

FIG. 4 illustrates the positioning of the control elements of the transmission when the same is conditioned for neutral. If the pump rotates positively it will impute a torque to turbine T causing shaft 5b and unit 30 to rotate positively. Sun gear 3a and ring gear 6b and the remainder of unit 6 may also rotate with the pump and turbine depending upon internal frictional forces. Unit 6 is connected to unit 33 which is also free to rotate positively since teeth 33d are positioned in space 6h between teeth 6m and 6r. Thus the pump and turbine will rotate together without restraint.

Forward

FIG. 5 illustrates the position of the elements of this invention when conditioned for automatic forward drive. The shift dog 43 engaging shift collar 34 has been moved forwardly, thus causing sliding unit 30 to move forwardly. This will push units 31 and 32 forward also. It will be seen that the teeth on connector 31 engage teeth on flange 13e and the teeth on shaft 5b. The teeth on section 32b of connector 32 engage the teeth on flange 11e, and section 32a engages both flanges 11m and 11h. Therefore, elements 11m, 11h and 11e will rotate as one unit as will units 5b and 13e. It should be apparent that one-way clutch 11k will prevent shafts 11d and 11c from rotating faster in a positive direction than shafts 13d and 5b.

The movement of shift dog 43 will also cause unit 33 to move forward so that teeth 33d will engage teeth 6m on shaft 6d. Thus shaft 6d will be directly connected to the remainder of unit 6, including ring gear 6b and sun gear 6a, so that the same rotate together.

It will be seen from the foregoing that when the transmission is conditioned for automatic forward drive, sun gear 6a will be directly connected to ring gear 6b through the elements numbered 33. Sun gear 11a will also be directly connected through element 32 to the inner race of one-way clutch 11k to rotor R-2. Additionally, rotor R-1 and hence sun gear 13a will be directly connected to the planet carrier 5b, turbine T and the outer race of one-way clutch 11k.

First Range

Assume that the input from prime mover to pump P is constant at a positive speed. Also assume that output shaft 21 is stalled. Pump P will exert a torque on turbine T and attempt to move planet carrier 5b positively. This will also place a positive torque on flange 13e, shaft 13d, rotor R-1 and sun gear 13a. Pump P will overrun clutch 3d and flange 13e will also overrun clutch 11k. As forward rotation of sun gear 13a is initiated (while the output is stalled) ring gear 14b will begin to rotate negatively. The combination of ring gears 14b and 14a is referred to as the stabilizer 14 and this, of course, will also begin to rotate negatively. Negative rotation of stabilizer 14 will begin to push compound planet gear 12 negatively. However, planet carrier 18 and shaft 19 are prevented from rotating negatively by one-way clutch 40, near the rear of the transmission. Thus, if compound planet gear 12 is to rotate negatively, the sun gears 17a and 11a must rotate positively. Positive rotation of sun gear 17a and shaft 17d will cause over-running of one-way clutch 60. Sun gear 11a will be urged to rotate positively faster than sun gear 13a since planet 12b is larger than planet 16. Since sun gear 11a is connected to the inner race of one-way clutch 11k, the same will lock up. Thus, sun gear 11a is restrained from rotating faster than sun gear 13a and consequently, a restraining force is applied against the negative rotation of stabilizer 14. It is this principle of restraining the negative rotation of stabilizer 14 which is at the heart of this transmission. Under conditions of total stall of output 21, sun gear 13a, stabilizer 14 and sun gear 11a will also be stalled. Positive torque will be imparted to the output through sun gear 13a and from stabilizer 14. Thus, all of the torque transmitted from pump P to turbine T will be transmitted directly to the output after being modified by the gear ratios.

As the output shaft 21 begins to rotate positively sun gear 11a will continue to restrain the negative rotation of stabilizer 14 since sun gear 11a may not rotate faster than sun gear 13a. Additionally, the tendency of sun gear 11a to urge forward, the inner race of one-way clutch 11k produces the regenerative power feed back which is another important feature of this invention.

During this initial phase, planet gear 12 will cause sun gear 6a to rotate negatively through reversing pinions 9. This will also cause ring gear 6b to rotate negatively and to react with the positive rotation of planet shaft 5c to accelerate sun gear 3a positively. Preferably the overall gear ratio between stabilizer 14 through the planet gears 12, reversing planet gear 9, sun gear 6a, ring gear 6b and planet gears 4 to the sun gear 3a is such that sun gear will be accelerated to equal the speed of pump P when the turbine is rotating at approximately 20% of the pump's speed. Thus, in the first phase of forward drive, one-way clutch 3g has not yet locked up so planet gear 12a will have no effect upon stabilizer 14.

It should also be noted that rotor R-2 will rotate with rotor R-1 and will not have any effect on stabilizer 14.

Second Range

As the speed of turbine T increases during the first range of operation, ring gear 6b will be driven reversely while planet gear 4 will be carried forwardly on planet shaft 5c with the turbine T. As explained previously, this will accelerate sun gears 3a and the inner race of one-way clutch 3g positively. Depending upon the gear ratios selected, one-way clutch 3g may lock up at, say, the point where turbine T rotates at 20% of the velocity of pump P. At this point, and as the turbine T continues to accelerate, ring gear 6b will be restrained from rotating negatively and, consequently, stabilizer 14 will also be further restrained from rotating negatively. As the negative rotation of stabilizer 14 is reduced at this point, it will be noted that one-way clutch 11k will begin to overrun due to the deceleration of sun gear 11a. Planet carrier 18 will still be restrained from reverse rotation by one-way clutch 40, and sun gear 17a will still be allowed to rotate positively while one-way clutch 60 overruns. It should be apparent that a dual path of torque will be set up which divides at the planetary gear system revolving around sun gear 3a. A first torque path runs from the turbine through the planet carriers 5c, through connector 31, housing 13c, rotor R-1, flange 13b and sun gear 13a to the output. The second path begins at the point of reaction at the point where one-way clutch 3g limits the reverse rotation of ring gear 6b, and runs from turbine T, through planet gears 4, ring gear 6b, sun gear 6a, reverse pinions 9, planet gears 12, stabilizer 14 and planet gears 16 to the output. This reaction torque is transmitted through connectors 33 to sun gear 6a and eventually to stabilizer 14. Although the stabilizer 14 is still rotating negatively, a positive torque will be exerted on planet gear 16 and, consequently, on the output shaft 21.

It should be noted that as clutch 11k begins to overrun with the deceleration of sun gear 11a and connector 32, the rotor R-2 will begin to decelerate and rotate slower than rotor R-1. Although rotor R-1 will exert some torque on rotor R-2, the second fluid coupler is preferably designed so that this torque will be minimal at this point and the reaction torque transmitted through sun gear 6a will overcome the torque exerted by sun gear 11a. Eventually rotor R-2 will be decelerated (again depending upon the specific gear ratio) to a point where rotor R-2 will reach zero velocity.

By the proper selection of gear ratios the transmission may be designed so that sun gear 6a continues to restrain negative rotation of stabilizer 14 until stabilizer 14 reaches zero velocity, at the point where the turbine is rotating at ⅓ of the velocity of pump P. When this occurs it will be noted that sun gear 17a, which has been rotating positively up to now, will lock up due to the action of one-way clutch 60. At this point compound planet gear 12 will have decelerated to zero velocity and will begin to rotate positively thus creeping around the sun gear 17a. Planet carrier 18 will be released to rotate freely in a forward direction by one-way clutch 40. Sun gear 11a, which had reached zero velocity, will now be accelerated in a negative direction, thus causing rotor R-2 to rotate negatively. As the compound planet gear 12 begins to rotate positively, stabilizer 14 will also rotate positively, thus further accelerating output shaft 21.

Third Range

The torque path in this range of operation is the same as in the second range of operation, with torque being applied as usual through the sun gear 13a and also from the sun gear 6a into stabilizer 14. In this range of operation, however, the torque from sun gear 6a reacts from sun gear 17a (now locked) rather than from planet carrier 18, as in the second range of operation.

The second fluid coupler comprising rotors R-1 and R-2 is preferably designed so that rotor R-2 can rotate negatively during this range of operation without overcoming the torque exerted by sun gear 6a.

Fourth Range

When the torque exerted on rotor R-2 (rotating negatively) and consequently on sun gear 11a, becomes great enough to overcome the torque in the opposite direction, exerted by sun gear 6a, the acceleration of rotor R-2 will cease and the negative rotation of rotor R-2 will begin to be reduced.

At this point a situation exists where opposing torques are exerted on planet gears 12 by sun gear 6a and sun gear 11a. As a condition of equilibrium is reached the entire assembly comprising planet pinions 12, sun gear 17a, planet carriers 18, sun gear 6a and sun gear 11a will rotate forwardly, thus further accelerating stabilizer 14. Under these conditions of equilibrium both overrunning clutch 40 and overrunning clutch 60 will release; however, if at any point an imbalance occurs so that the torque exerted by sun gear 11a does not match the torque exerted by sun gear 6a, one-way clutch 60 may lock up, thus returning the transmission to third range.

Thus, it should be apparent that second fluid coupler comprising rotors R-1 and R-2 should be designed so that rotor R-2 will be allowed to rotate negatively to a certain extent without transfer of appreciable torque. The design of this fluid clutch should be selected according to principles well known in the art so that the balancing function may be obtained between sun gears 11a and 6a as described.

It should be aparent that the transmission is now operating under conditions that transmit torque to the output through a 3-way path. As in all previous cases torque is transmitted to sun gear 13a from turbine T. In the fourth range of operation, however, torque is also transmitted through rotor R-2 to sun gear 11a and, as before, through sun gear 6a.

If it is assumed that the input to the pump P remains at a constant velocity, it should be apparent that from the point of stall through all four ranges of operation to the point where turbine is rotating at its maximum possible velocity, each transition from one range to the next will cause a change in torque transmitted, but not a change in speed of either the pump or the turbine at the point of transition.

In some cases it might be possible for the third range of operation to be skipped entirely in the progression of this transmission. The period of time during which third range is operative depends upon the amount of torque transmitted from rotor R-1 to rotor R-2 as measured against the opposing torque exerted by sun gear 6a. Under certain conditions it is conceived that the torque exerted from rotor R-2 on sun gear 11a may overcome the opposing torque of sun gear 6a at an early point, even to the extent that the transmission may shift from second range immediately to fourth range of operation under certain conditions.

Auxiliary Range

This transmission includes an auxiliary range which may be useful under some driving conditions such as starting from stall on slick surfaces. This range enables the driver to start from stall in an intermediate range of operation and then continue automatically to higher ranges.

To condition this transmission for auxiliary drive, the shift dog 43 is left in the original position described for automatic forward drive, as illustrated in FIG. 5. Additionally, clutch band 65 is engaged by conventional means such as the lever 67 illustrated in FIG. 1C. This action will hold shaft 17d and, consequently, sun gear 17a stationary under all conditions.

As torque is applied under stall conditions, sun gear 13a will attempt to move in a forward direction thus tending to rotate stabilizer 14 negatively. Since sun gear 17a is locked up and planet carriers 18 will be prevented from rotating negatively, stabilizer 14 will also be prevented from rotating negatively. Thus torque will be applied to output shaft depending only upon the gear ratio of the planetary gear set around sun gear 13a. When the turbine reaches a velocity which is a predetermined percentage of the velocity of pump P (e.g.⅓), one-way clutch 3g will lock up thus initiating the third range of operation as previously described. Fourth range will not become operative as long as clutch band 65 is engaged.

Compression Braking During Automatic Forward Drive

If cruising conditions have been reached and the accelerator pedal is released so that the output shaft 21 overruns, or attempts to drive the prime mover, the following conditions will occur. A forward torque will be exerted by output shaft 21 on planet shaft 15 and, consequently, on sun gear 13a, rotor R-1, through connector 31 to planet shaft 5c and to turbine T, which will be resisted by pump P. As a result of this resistance, planet gears 16 will also attempt to push stabilizer 14 forwardly. Sun gear 6a will be prevented from rotating faster than turbine T by the lock-up of one-way clutch 5g. Turbine T will also be prevented from rotating faster than pump P by the lock-up of clutch 3g. Therefore, stabilizer 14 will urge planet carrier 18 to rotate forwardly. Sun gear 17a rotates positively with carrier 18, causing one-way clutch 60 to overrun, and sun gear 11a will be restrained from rotating negatively by the action of rotor R-1 on rotor R-2. It should be apparent that locking up of both of one-way clutches 3g and 5g will result in the uniform forward rotation of pump P, turbine T, the entire planetary gear set around sun gear 3a, sun gear 6a, rotor R-1 and sun gear 13a.

Fluid Braking In Conjunction With Compression Braking

Additional braking may be obtained by engagement of clutch band 65 to restrain or stop sun gear 17a. As this occurs, compound planet gears 12 will react by rotating around sun gear 17a and thus the speed of sun gear 11a and rotor R-2 will be greatly reduced imparting additional drag on the output through the primary sun gear 13a and rotor R-1. At the same time, as the result of the compound planet gears 12 rotating around sun gear 17a, the stabilizer will be accelerated positively to relieve some of the drag on the output; however, a balance of forces will occur resulting in a net increase in braking effect. Also, sun gear 6a will be accelerated, causing secondary ring gear 6b and hence turbine T (since one-way clutches 5g and 3g are locked) to accelerate. This will also increase the effect of compression braking on the transmission.

Constant First Range

To condition the transmission for constant first range, rack 45 should be moved as far forward as possible (See FIG. 1B) so that detent ball 47 will drop into detent position "a". This position is not specifically illustrated in the Figures. However, it may be seen from FIG. 1B that the following conditions will occur. Teeth 33d will be positioned in space 6k. Section 32b on connector 32 will engage flange 11e and flange 11h. Section 32a on connector 32 and connector 31 will both engage flange 13e and connector 31 will also engage shaft 5b. Under these conditions planet shaft 5c, rotor R-1, sun gear 13a, rotor R-2 and sun gear 11a will all be directly connected together. It should be apparent that sun gear 11a will be prevented from rotating either faster or slower than sun gear 13a and, therefore, the transmission will be engaged at all times in the first range of operation. Note that sun gear 6a is not connected to ring gear 6b.

Constant Third Range

Referring to FIG. 1B, the transmission may be conditioned for constant third range by moving rack 45 so that detent ball 48 is in detent position "c". In this position teeth 33d will mesh with teeth 6m, thus connecting sun gear 6a with ring gear 6b. Connector 32 will engage flange 11e with the inner race of one-way clutch 11k. Flange 11h will be free to rotate in space 32c. Connector 31 will engage flange 13e with shaft 5b. It should be apparent that in this mode of operation the transmission will operate exactly as though it were conditioned for regular forward drive except that fourth range will be eliminated. This occurs since flange 11h and, consequently, rotor R-2 are free to turn in either direction in an unrestricted manner.

Both fourth and third ranges may be eliminated by engaging the transmission as previously described so as to eliminate fourth range and also shifting lever 68 to disengage the inner race of one-way clutch 60 from housing 52. From the previous description of the third range of operation it will be apparent that disengaging the sun gear 17a in this manner will prevent initiation of third range. Thus, under these conditions the transmission will be limited to operation in first or second ranges only.

Reverse

In order to condition the transmission for reverse drive, the rack 45, illustrated in FIG. 1B, is shifted to the rear so that detent ball 47 will fall into detent position "c". Under these conditions it will be observed that teeth 45c and 45b on the rack 45 will engage teeth 41a and 50a. Teeth 33d will engage teeth 6r, thus connecting sun gear 6a to ring gear 6b. The teeth on flange 30b will engage teeth 6c, thus directly connecting ring gear 6b to the planet shafts 5c, and resulting in the direct connection of turbine T to sun gear 6a. Note that connector 31 will release shaft 5d. Connectors 31 and 32 will connect flange 13e, flange 11h, one-way clutch 11k and flange 11e. Thus sun gear 13a, rotor R-1 rotor R-2 and sun gear 11a will be connected together as a single unit. Additionally, lever 68 should be moved so that one-way clutch 60 is disconnected from the housing 52. It should be understood that lever 68 may be interconnected by conventional means with shift lever 46 so that it is not necessary to separately engage this lever in order to condition the transmission for reverse drive.

Forward motion of turbine T will cause sun gear 6a to move forwardly also. Planet carrier 18 is prevented from moving forwardly by the engagement of teeth 41a with rack 45, thus forward rotation of sun gear 6a, through planet pinions 9, will induce a forward rotation in compound planet gears 12. This will cause sun gear 11a to rotate negatively and thus, through shroud 13c, simultaneously rotate sun gear 13a negatively. The positive rotation of compound planet gears 12 will tend to move the stabilizer 14 forwardly; however, the positive movement transmitted to planets 16 by stabilizer 14 will not be as great as the negative movement transmitted to planets 16 by sun gear 13a, thus resulting in a net negative rotation of the planet carrier 20 and output shaft 21.

In the previous descriptions of forward modes of operation, it was noted that the stabilizer 14 effectively subtracted from the positive rotation of sun gear 13a. Conversely, in the reverse mode of operation, the stabilizer 14, now rotating positively, subtracts from the negative rotation of sun gear 13a. Also, in response to any resistance in the output a regenerative power feed back will develop through the stabilizer 14, to compound planet gears 12, where the feedback divides into sun gear 11a and sun gear 6a (through reversing pinions 9). After dividing, this feedback will be in a negative direction, thus aiding the negatively rotating sun gears 11a and 13a, but in a positive direction, thus aiding the positively rotating sun gear 6a and turbine T.

Reverse range is constant at all times and there is no change in gear ratio or output velocity ratio.

Hill Holding

When the transmission is conditioned for forward drive, it will prevent the vehicle from rolling backwards. As the output 21 begins to rotate negatively, both sun gear 13a and stabilizer 14 will be urged negatively. Since compound planet carrier 18 is prevented from rotating negatively by one-way clutch 40, compound planet pinions 12 will tend to urge sun gear 11a forward. This, together with negative movement of unit 13 will cause one-way clutch 11k to lock up. This lock-up will prevent either sun gear 13a or stabilizer 14 from any further negative movement, thus preventing negative movement of the output 21.

When the transmission is conditioned for reverse, forward rotation of the output will also be prevented. As the output 21 begins moving forward, stabilizer 14 and sun gear 13a will move forward. Since, compound planet carrier 18 is now prevented from forward rotation, sun gear 11a will begin to rotate reversely. However, sun gear 11a and sun gear 13a are directly connected by connectors 31 and 32, and lock-up will again occur preventing forward rotation of the output.

Alternative Embodiments

In the embodiment illustrated in FIG. 6, it will be noted that rotor R-1 is connected directly to the output shaft rather than to the shroud as in the embodiments described in FIGS. 1 through 5. Thus, rotor R-1 will rotate at the velocity of the output shaft rather than at the velocity of the turbine T. The lower velocity of rotor R-1 will mean that rotor R-2 will "see" less resistance as it rotates negatively. Therefore, the transition to fourth range will be delayed and the period during which third range is active will be extended relative to previously described embodiments. In other respects this embodiment is the same as the previous description.

The embodiment illustrated in FIG. 8 also operates almost identically to the embodiment illustrated in FIGS. 1 through 5, except that sun gear 17a has been eliminated. This will effectively result in elimination of the third range of operation, so that the transmission illustrated in FIG. 8 will have only three ranges equivalent to the first, second and fourth ranges of operation of the preferred embodiment.

It should also be noted that the embodiment illustrated in FIG. 8 has a slightly different shifting mechanism (specifically in the area of connector 831) than earlier described embodiments. Nevertheless, the basic functioning, the manner in which various elements are connected, and the progression of the driving elements are similar to the embodiments illustrated in FIGS. 1 through 5.

The embodiment illustrated in FIG. 7 operates in only two forward ranges equivalent to the first and second ranges of operation of the embodiments previously described. For forward drive the clutch 782 would be engaged to engage the turbine to sun gear 713a. The negative rotation of stabilizer 714 is restrained by reaction with the positive rotating sun gear 711a in conjunction with carrier 718, which is held stationary by one-way clutch 740. As the differential in speed between the pump P and turbine T decreases, and the negative rotation of sun gear 706b increases, the one-way clutch 703g will lock up, thus further restraining negative rotation of stabilizer 714. As the one-way clutch 703g locks up, the other clutch 740 will release, thus allowing planet carrier 718 to begin forward rotation.

To condition this embodiment for reverse drive, clutch 782 would be released and clutch band 780 would be engaged, to condition the transmission in a manner similar to that described for reverse in the preferred embodiment as previously described.

The embodiment illustrated in FIG. 9 operates on the same principle as the other embodiments; however, the compound planetary gear set has been reduced to a simple planetary gear set, the secondary planetary gear set has been eliminated and a second fluid coupler has been substituted for those elements to apply positive torque to the stabilizer 914 under certain conditions. As a result of the simplicity of this embodiment, which does not include means to provide for reverse drive or neutral, separate means may be desired to provide for these functions.

Referring to FIG. 9, if the transmission is starting from stall conditions, the turbine T will impart positive rotation to both sun gears 913a and 911a. The load on output 921 will restrain primary planet carrier 920 and stabilizer 914 will begin to rotate negatively. Stabilizer 914 is not free to rotate negatively, however, since planet carrier 918 is prevented from reverse rotation by one-way clutch 940. Under these conditions the operation of this embodiment is basically the same as 1st range of previously described embodiments.

It will be apparent that as stabilizer 914 rotates negatively, rotor R-2 of the second fluid clutch will rotate with it. This clutch should be designed, according to principles well known in the art, to allow some negative rotation of rotor R-2 while rotor R-1 moves positively with turbine T; however, with increasing slip between rotors R-1 and R-2 increased positive torque will be applied to the stabilizer 914. Under certain load conditions, the negative rotation of stabilizer 914 may be reduced, or positive rotation initiated so that planet carrier 918 rotates forwardly, releasing clutch 940. Thus the influence of the simple planetary gear set will be eliminated and the difference in rotation between primary sun gear 913a and primary ring gear 914a will equal the difference in rotation between the turbine T (or rotor R-1) and rotor R-2.

It should be noted that similar results may result if the rotor R-2 is connected to planet carrier 918 rather than stabilizer 914. This variation is not shown in the drawings.

Having set forth the invention in what is considered to be the best embodiment thereof, it will be understood that changes may be made in the system as above set forth without departing from the spirit of the invention or exceeding the scope thereof as defined in the following claims.

I claim:
1. A transmission comprising:
   (a) a fluid coupler having a pump to which an input is connected, and a turbine;
   (b) a primary planetary gear set with a sun gear having means associated therewith for connecting said sun gear to the turbine, a planet carrier connected to an output, a planet gear and a ring gear;
   (c) and means including a second planetary gear set having a ring gear attached to and rotatable with the ring gear of said primary planetary gear set for applying positive torque to the ring gear of the primary planetary gear set.
2. The transmission of claim 1 wherein the means to apply positive torque to the ring gear of the primary planetary gear set also includes a second fluid coupler.
3. A transmission comprising:
   (a) a fluid coupler having a pump, to which an input is connected, and a turbine;
   (b) a primary planetary gear set with a sun gear connected to the turbine, a planet carrier connected to an output, a planet gear and a ring gear;
   (c) a compound planetary gear set having a compound planetary gear with at least two gear elements connected to each other and rotatable on a common planet carrier, and having a ring gear engaging one of said gear elements, a first sun gear engaging with one of the gear elements, and a second sun gear, engaging a direction reversing idler which engages another gear element, said idler being rotatable on the compound planet gear carrier, said first and second sun gears being of smaller diameter than the sun gear of the primary planetary gear set;

(d) means to prevent the planet carrier of the compound planetary gear set from rotating in a negative direction;

(e) a secondary planetary gear set having a sun gear, a planet carrier connected to the turbine, a planet gear and a ring gear;

(f) means to prevent the sun gear of the secondary planetary gear set from rotating faster than the pump;

(g) means to connect the second sun gear to the ring gear of the secondary planetary gear set;

(h) means to connect the first sun gear to the turbine;

(i) means to connect the ring gear of the compound planetary gear set to the ring gear of the primary planetary gear set.

4. A transmission comprising:
(a) a fluid pump and a turbine;
(b) a fluid coupler having a first rotor and a second rotor;
(c) a primary planetary gear set with a sun gear connected to the first rotor, a planet carrier connected to an output, a planet gear and a ring gear;
(d) a secondary planetary gear set with a planet carrier connected to the turbine, a sun gear, a planet gear and a ring gear;
(e) a compound planetary gear set with a single ring gear connected to the ring gear of the primary planetary gear set, a compound planetary gear having at least two planet gear elements connected to each other, and rotatable on a planet carrier, one of said elements engaging said ring gear and a first sun gear and another of said elements engaging a direction reversing idler which engages a second sun gear of smaller diameter than the first sun gear, both of the first and second sun gears being of smaller diameter than the sun gear of the primary planetary gear set;
(f) means to prevent the sun gear of the secondary planetary gear set from rotating faster than the pump;
(g) means associated with the compound planet carrier selectively controllable to one of the modes of operation consisting of preventing rotation of said carrier in either direction and preventing rotation of said carrier in a negative direction;
(h) means to engage and disengage the first sun gear to the planet carrier of the secondary planetary gear set;
(i) means associated with the secondary planetary gear set for preventing the ring gear from rotating faster than the planet carrier;
(j) means to connect the first sun gear to the second rotor;
(k) means to prevent the second rotor from rotating faster than the first rotor;
(l) means engageable to connect the first rotor to the planet carrier of the secondary planetary gear set;
(m) means engageable to prevent rotation of the second sun gear in either direction;
(n) means to engage and disengage the first sun gear to the first rotor.

5. A transmission comprising:
(a) a fluid pump and a turbine;
(b) a fluid coupler having a first rotor and a second rotor;
(c) a primary planetary gear set with a sun gear connected to the first rotor, a planet carrier connected to an output, a planet gear and a ring gear;
(d) a secondary planetary gear set with a planet carrier connected to the turbine, a sun gear, a planet gear and a ring gear;
(e) a compound planetary gear set with a single ring gear connected to the ring gear of the primary planetary gear set, a compound planet gear having three gear elements connected to each other and rotatable on a planet carrier, one of said elements engaging said ring gear, a first sun gear engaging with one gear element, a second sun gear of smaller diameter than the first sun gear, engaging with another gear element, and a third sun gear of smaller diameter than the second sun gear, engaging with a direction reversing idler which engages with the remaining gear element, all of said first, second and third sun gears being of smaller diameter than the sun gear of the primary planetary gear set;
(f) means associated with the secondary planetary gear set to prevent the sun gear from rotating faster than the pump;
(g) means associated with the first sun gear to prevent rotation of said gear in a negative direction;
(h) means associated with the compound planet carrier selectively controllable to one of the modes of operation consisting of preventing rotation of said carrier in any direction and preventing rotation of said carrier in a negative direction;
(i) means to engage and disengage the third sun gear to the ring gear of the secondary planetary gear set;
(j) means associated with the secondary planetary gear set for preventing the ring gear from rotating faster than the planet carrier;
(k) means to engage and disengage the second sun gear to the second rotor;
(l) means selectively engageable to prevent the second rotor from rotating faster than the first rotor;
(m) means selectively engageable to connect the first rotor to the planet carrier of the secondary planetary gear set.

6. The transmission of claim 5 wherein the means associated with the first sun gear is selectively controllable to one of the modes of operation consisting of permitting rotation of said gear in either direction, preventing rotation of said gear in a negative direction and preventing rotation of said gear in either direction.

7. The transmission of claim 5 further comprising means to prevent the third sun gear from rotating faster than the ring gear of the secondary planetary gear set.

8. The transmission of claim 5 further comprising means associated with the secondary planetary gear set to connect the ring gear to the planet carrier.

9. A transmission comprising:
(a) a pump and a turbine;
(b) a primary planetary gear set with a planet carrier connected to an output, and with a planet gear, a sun gear and a ring gear;

(c) a secondary planetary gear set with a planet carrier connected to the turbine, and with a sun gear, a planet gear and a ring gear;

(d) a compound planetary gear set having a compound planet gear with at least two planet gear elements, one of which engages a ring gear and a first sun gear, and another of which engages with a direction reversing planet idler gear, which engages a second sun gear, both of said sun gears being of smaller diameter than the sun gear of the primary planetary gear set;

(e) means to connect the ring gear of the compound planetary gear set to the ring gear of the primary planetary gear set;

(f) means to connect the second sun gear to the ring gear of the secondary planetary gear set;

(g) means to connect the first sun gear to the sun gear of the primary planetary gear set;

(h) means to connect the sun gear of the primary planetary gear set to the planet carrier of the secondary planetary gear set;

(i) means to prevent the sun gear of the secondary planetary gear set from rotating faster than the pump;

(j) means to prevent the compound planet carrier from rotating in a negative direction.

10. The transmission of claim 9 further comprising means to selectively connect and disconnect the sun gear of the primary planetary gear set to the planet carrier of the secondary planetary gear set.

11. The transmission of claim 9 further comprising means associated with the secondary planetary gear set to prevent the ring gear from rotating faster than the planet carrier.

12. The transmission of claim 9 further comprising means selectively engageable to prevent the compound planet carrier from rotating in either direction.

13. A transmission comprising:
(a) a pump and a turbine;
(b) a fluid coupler having a first rotor and a second rotor;
(c) a primary planetary gear set with a planet carrier connected to the first rotor and to output means, and with a sun gear, a planet gear and a ring gear;
(d) a secondary planetary gear set with a planet carrier connected to the turbine, and with a sun gear, a planet gear and a ring gear;
(e) a compound planetary gear set with a single ring gear connected to the ring gear of the primary planetary gear set, a compound planet gear having three gear elements connected to each other and rotatable on a planet carrier, one of said elements engaging the ring gear, a first sun gear engaging with one gear element, a second sun gear of smaller diameter than the first sun gear, engaging with another gear element, and a third sun gear of smaller diameter than the second sun gear, engaging with a direction reversing idler which engages with the remaining gear element, all of the first, second and third sun gears being of smaller diameter than the sun gear of the primary planetary gear set;
(f) means associated with the secondary planetary gear set to prevent the sun gear from rotating faster than the pump;
(g) means associated with the first sun gear to prevent rotation of said gear in a negative direction;
(h) means associated with the compound planet carrier selectively controllable to one of the modes of operation consisting of preventing rotation of said carrier in any direction and preventing rotation of said carrier in a negative direction;
(i) means to engage and disengage the third sun gear to the ring gear of the secondary planetary gear set;
(j) means associated with the secondary planetary gear set for preventing the ring gear from rotating faster than the planet carrier;
(k) means to engage and disengage the second sun gear to the second rotor;
(l) means selectively engageable to prevent the second rotor from rotating faster than the sun gear of the primary planetary gear set;
(m) means selectively engageable to connect the sun gear of the primary planetary gear set to the planet carrier of the secondary planetary gear set.

14. A transmission comprising:
(a) a fluid coupler having a pump to which an input is connected, and a turbine;
(b) a planetary gear set with a sun gear having means associated therewith for connecting said sun gear to the turbine, a planet carrier connected to an output, a planet gear and a ring gear;
(c) and means responsive to variations in the speed of rotation of the pump, the speed of rotation of the turbine and the speed of rotation of the output for controlling the speed of rotation of the ring gear of said planetary gear set.

15. A transmission comprising:
(a) a fluid coupler having a pump to which an input is connected, and a turbine;
(b) a primary planetary gear set with a sun gear having means associated therewith for connecting said sun gear to the turbine; a planetary carrier connected to an output, a planet gear and a ring gear;
(c) and a second planetary gear set having a ring gear attached to and rotatable with the ring gear of said primary planetary gear set and having a second sun gear coupled to said attached ring gears by means allowing negative rotation of said attached ring gears during first and second ranges of operation of said transmission.

16. A transmission comprising:
(a) a fluid coupler having a pump to which an input is connected, and a turbine;
(b) first and second planetary gear sets having a common full floating ring gear engaged respectively with planet gears in said first and said second planetary gear sets, means for connecting the sun gear of said first planetary gear set to said turbine, means for connecting the planet carrier of said first planetary gear set to an output, means connected with the planet gears of said second planetary gear set for controlling the rate and direction of rotation of said ring gear engaged with said planet gears;
(c) and means including a plurality of clutches sequentially engagable to effect a gradual transition from one range of operation of said transmission to the next range of operation of said transmission by controlling rotation of at least one gear in said planetary gear set.

* * * * *